Patented Jan. 4, 1949

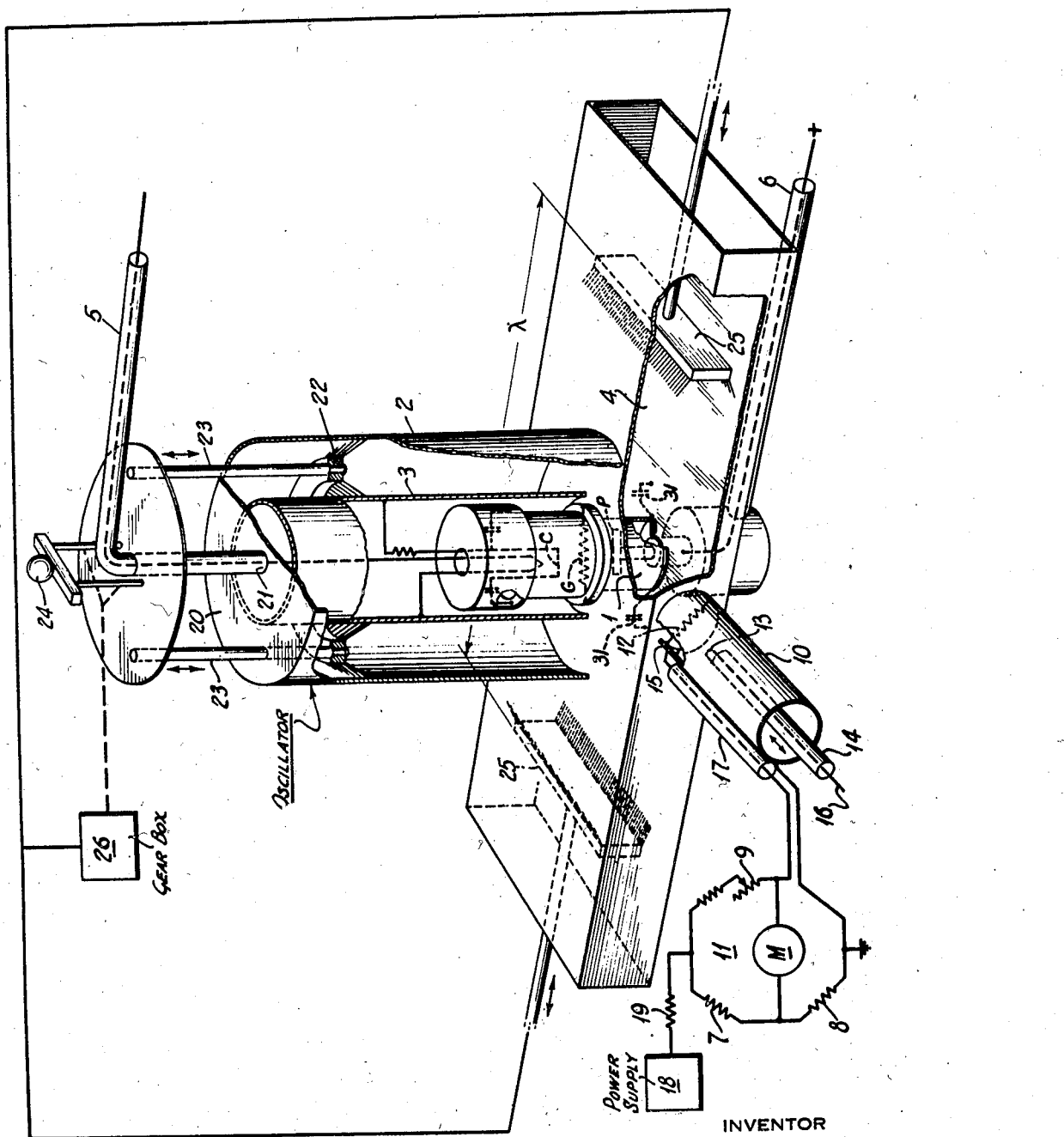

2,457,997

UNITED STATES PATENT OFFICE 2,457,997

ULTRA HIGH FREQUENCY POWER MEASURING SYSTEM

Ralph W. George, Riverhead, N. Y., assignor to Radio Corporation of America, a corporation of Delaware Application March 26, 1943, Serial No. 480,612

9 Claims. (Cl. 171—95)

1

The present invention relates to an ultra high frequency measuring system for use at frequencies on the order of 3,000 megacycles or so.

One object of the invention is to provide an efficient microwave signal generator for use at ultra high frequencies in the range between 2000 and 4000 megacycles.

Another object is to provide a novel electron discharge device oscillator system having an adjustable coaxial line resonator connected between the grid and cathode of the device, and an adjustable low loss cavity resonator coupled between the anode and grid of the device.

A further object is to provide in an ultra high frequency measuring system, a stable reference level indicator utilizing a Wollaston wire.

A still further object is to provide an improved form of ultra high frequency voltage or current indicator utilizing a Wollaston wire connected in a bridge circuit which can be used at frequencies up to or above several thousand megacycles.

Various features of the invention relate to the arrangement which includes suitable mechanical drive ratios moving the cathode slider at a different rate than the grid-anode cavity slider, and to the means for reducing the tendency for spurious oscillations to occur in the cavity resonator.

The single figure of the drawing illustrates the improved type of signal generator of the invention, which utilizes, among other things, a novel form of oscillator and Wollaston wire and bridge circuit to indicate the signal input level as a calibrating reference.

Referring to the drawing, the improved signal generator comprises a vacuum tube triode 1, having associated with its grid G and cathode C a tunable coaxial line resonator circuit 2, 3 and associated with its grid G and anode P a relatively high Q tunable resonant cavity 4. The vacuum tube 1 which is illustrated is of the type generally referred to as a "lighthouse" tube, and is described in more detail hereinafter. The heating current for the cathode and the positive polarizing potential for the anode are supplied through high loss coaxial radio frequency low pass filter lines 5 and 6, respectively.

Attenuator

The voltage or current indicator and associated bridge circuit 11 is incorporated with an attenuator cylinder 10. The input end of the attenuator cylinder 10 projects into the interior of the cavity resonator 4 (as shown) and carries a Wollaston wire in the form of an extremely thin 0.0001 inch platinum resistance wire 12. A

2 thin wire of this kind has a direct current resistance which is the same as its resistance at the operating radio frequency for any fixed operating temperature. The direct current and radio frequency resistances of this wire are the same for a given power input only up to such high frequencies that the current distribution in the wire remains substantially uniform. Within the attenuator cylinder 10 there is provided a coupling loop 13 which is carried on and movable with a supporting cylinder 14. The end of the attenuator cylinder 10 which supports the Wollaston wire 12 is inserted within the cavity 4 for energizing the Wollaston wire. If desired, a suitable adjustment of the degree of coupling may be provided between the cavity resonator 4 and the cylinder 10. It should be noted that one end of the Wollaston wire 12 is directly connected to one end of the cylinder 10, while the other end of the wire 12 is capacitatively coupled to the cylinder 10 by means of a small metallic plate 15 which is mounted upon but separated from the cylinder 10 by means of mica insulators. The plate 15 is located at the end of the cylinder 10 which is slightly recessed to permit the plate 15 to be mounted on the cylinder without unduly projecting therefrom.

The movable cylinder 14 in the interior of the attenuator pipe 10 and which carries the coupling loop 13 is movable in the direction of the length of the pipe 10 so as to adjust the position of the loop 13 toward or away from the resistance 12. Adjustment of the position of the loop 13 serves to provide different degrees of coupling to the field at the mouth of the attenuator cylinder 10. The output end of the attenuator system is connected to cable 16 which, if desired, may be connected by means of a jack to the attenuator and have such a loss as to furnish a substantially fixed source of impedance, looking from the load, to which the cable 16 is connected, into the signal generator. That end of the Wollaston wire 12 which is capacitively coupled at 15 to the attenuator cylinder 10 is also connected by means of the high loss coaxial low pass radio frequency filter line 17 to the bridge circuit 11.

In one particular embodiment of the invention, the attenuator cylinder 10 was rather small in diameter; namely, 0.200 inch, which, with an associated suitable nut and thread arrangement involving an accurately cut forty threads per inch for the displacement control of the interiorly located support 14 and loop 13, provided an output change of the attenuator of four db. (decibels) per turn of the control nut. The small diameter of the attenuator cylinder 10 is used to minimize the difference between the actual and the calculated rate of attenuation at low frequencies. This provides a substantially constant rate of attenuation versus frequency, up to several thousand megacycles. At 3000 megacycles, the error between actual and calculated rate of attenuation at low frequencies is on the order of one decibel in 200 decibels. Attention is directed to Fig. 2 of my United States Patent No. 2,204,179, granted June 11, 1940, for details of construction suitable for the nut and thread arrangement of the attenuator in order to provide an adjustment in position of the coupling loop 13 relative to the open end of the attenuator cylinder 10.

Bridge circuit

The bridge circuit 11, which is part of the current or voltage indicator system, includes a pair of fixed arms 7 and 8, an adjustable arm 9, and the Wollaston wire 12 constituting the fourth arm. This Wollaston wire 12 is connected to the bridge 11 through the low pass radio frequency filter line 17. A suitable meter M, which may have a range of from zero to 200 microamperes, is connected across the bridge between the junction points of arms 7 and 8 and arms 9 and 12. The junction point between the fixed arm 8 and the cable 17 is grounded (as shown), while the junction point between the fixed arm 7 and the adjustable arm including resistor 9 is connected to a regulated power supply 18 through a resistor 19. This power supply, by way of example, may supply +150 volts to the resistor 19. This bridge circuit, it will be seen, is substantially identical with the bridge circuits of Figs. 3 and 4 of my copending United States application Serial No. 408,570, filed August 28, 1941, now U. S. patent 2,399,481 to which reference is made, and wherein a Wollaston wire is used having a resistance of about 73 ohms.

In order to measure the current or voltage, the bridge 11 is first balanced with no radio frequency voltage applied to the Wollaston wire 12. The application of radio frequency voltage to the Wollaston wire 12 caused by exciting the cavity resonator 4 will cause the Wollaston wire to heat up and its resistance to increase, thus throwing the bridge out of balance and producing a deflection on the microammeter M. The sensitivity of the bridge circuit is determined in part by the resistance 19 in series with the regulated power supply equipment 18. The deflection on the microammeter M, it will be understood, is merely an indication of the relative magnitude of the power in the Wollaston wire 12. If desired, in order to use the bridge as a volt or current meter, it is necessary to calibrate the deflection of the microammeter for known amounts of power measured at low frequencies in the Wollaston wire 12. This can be done by utilizing a suitable known voltage calibrating source to replace the radio frequency voltage in order to provide the same power in Wollaston wire 12 to give the same deflection. The bridge circuit can thus be used either as a volt or a current meter (or power). Actually, all that is required is a stable reference level indicator.

Oscillator

The oscillator circuit includes a vacuum tube 1 of the "light house" type, wherein the grid and anode connections protrude through the glass envelope in the form of metallic rings spaced from one another along the length of the tube. These metallic rings or discs make contact all around their respective electrodes and connect with the cavity resonator 4 on opposite sides of the cavity, as shown. One such "light house" tube, mentioned here by way of example, is the General Electric type GL-446 triode, which has been used satisfactorily in several embodiments of the invention. The oscillator vacuum tube is held in place by spring pressure on the base, which forces the grid and plate rings against their respective contact springs (not shown) in the cavity resonator 4.

The grid-cathode circuit includes a tunable coaxial line having an inner cylinder 3 and an outer cylinder 2, connected together at one end by an end plate 20. The inner conductor 3 of the coaxial line is large enough to accommodate in its interior the cathode of the tube and its surrounding envelope, as shown. The end plate 20 is provided with an aperture 21 in its center, to permit a connection from the heater of the cathode to extend through the high loss coaxial radio frequency filter line 5 to a source of heater energy. The tunable coaxial line 2, 3 is adjustable by means of a slider 22, which extends entirely around the inner conductor 3 and has contact springs connecting both the inner and outer conductors of the coaxial line resonator. This slider 22 has a multiplicity of contact springs making contact with the inner and outer conductor all around the interior of the resonator, and is provided with a plurality of plunger rods 23, 23, in turn, connected together and to a control knob 24.

The cavity resonator 4 is directly connected on one side (the upper side shown in the drawing) to the grid ring, so that this side of the resonator makes contact substantially all around the grid ring. This cavity resonator is coupled on its opposite side (the lower side shown in the drawing) to the anode ring from which it is separated only by a thin mica ring (not shown) forming a radio frequency by-pass capacity which has an extremely low impedance to the radio frequency energy of the operating frequency. This capacity is represented diagrammatically by the dotted capacitors 31 which connect the lower side of the resonator 4 to the anode ring. Thus, opposite sides of the cavity resonator are coupled to the grid and anode rings of the "light house" vacuum tube 1. The cavity length is controlled by means of sliders 25, 25 symmetrically disposed on opposite sides of the tube 1, it being understood that the tube 1 is located along one axis of the resonator. It is preferred that the electrical length of the cavity be one wavelength at the operating frequency so that the vacuum tube 1 is located at a relatively low impedance point in the plate-grid tuned circuit. the desired mode of oscillation in the cavity resonator 4 is primarily obtained by suitable tuning of the cathode-grid coaxial line resonator 2, 3. However, with certain cathode tuning adjustments, the feed-back may be found suitable to support more than one mode of oscillation, with the result that undesired frequencies will be obtained. Avoidance of these undesired frequencies which may be present at one time is usually achieved by changing the length of the cathode-grid tuning circuit by amounts equal to one or more multiples of a half wavelength, thereby retaining proper feed-back phase relations for the desired frequency while substantially altering the feed-back relations for the undesired frequency.

Sliders 25, 25 of the cavity resonator 4 are both linked together and, in turn, connected through a gear box 26 for unicontrol movement by means of the knob 24. Thus, a single tuning control knob 24 is linked to the coaxial line 2, 3 and to the sliders of the cavity resonator 4. In certain embodiments tried out in practice it was found to be necessary to move the cathode slider 22 at a different rate than the sliders 25, 25 of the grid-anode cavity 4. It is preferred that there be provided a secondary adjustment control (trimmer) of the cathode-grid circuit in order to obtain the most efficient oscillation condition. This secondary adjustment control which is connected only to the plunger rods 23, 23 may be operated by pushing a knob in the panel to disengage the locking mechanism connecting the knob 24 with the gear box 26, and turning it either to the right or the left, as desired.

In one embodiment of the present invention satisfactorily constructed and operated, the oscillator was designed to operate at frequencies between 2700 megacycles and 3700 megacycles. A spurious lower frequency oscillation mode, occurring near a desired frequency of about 2825 megacycles, was substantially suppressed by the use of a small short circuiting element 30 inserted between the walls of the cavity 4 near the tube 1 and across the narrow dimension of the cavity. An apparent effect of this suppressor 30 is to reduce the frequency versus change in cavity length in the region of the frequency at which the spurious oscillation was had. A tendency of the oscillator to jump to a higher frequency mode was found when the anode input voltage was raised above a critical value at the lower frequencies, around 2700 to 2800 megacycles, corresponding to a wavelength of approximately 11 centimeters. Satisfactory operation was had in this particular case by using a minimum required anode input voltage. The existence of this spurious mode was indicated by an abrupt increase in oscillation intensity.

In an embodiment of the invention tried out in practice, the oscillator functioned easily to provide a normal output at 3000 megacycles with an anode current of 15 milliamperes and an anode voltage of 220 volts. In another embodiment, a power output of seven tenths of a watt was obtained at 2700 megacycles with five watts anode power input.

The use of the high loss coaxial lines 5 and 6, serving as radio frequency filters, substantially eliminate radio frequency leakage. The high loss in these lines was obtained by drawing copper tubing over a varnish impregnated cotton covered iron wire. Each filter line in one embodiment of the invention was about ten feet long and wound on a spool for compactness.

If desired, the narrow dimension part of the grid-anode cavity 4 on the side opposite that in which the attenuator is inserted, may be provided with a tapped hole in which a coupling loop can be inserted and power taken out for general purposes.

What is claimed is:

1. The combination with an ultra high frequency generator including a radio frequency oscillator tunable over a band of frequencies, a hollow body resonator for determining the frequency of said oscillator, of a measuring device including an attenuator in the form of a hollow metallic pipe having one end inserted into said resonator, said attenuator having a Wollaston wire coupled across said one end of said pipe, said wire being in coupling relation with the radio frequency magnetic field in said resonator, and a resistance change indicator circuit coupled to said Wollaston wire.

2. The combination with an ultra high frequency oscillator which is tunable over a band of frequencies and has a hollow body resonator as a frequency determining element, of a resistance change indicating bridge circuit having as one arm thereof a Wollaston wire in coupling relation to the radio frequency field within said resonator, said Wollaston wire being connected to the elements of said bridge through a high loss coaxial line low pass radio frequency filter.

3. The combination with a hollow body resonator having means for producing a radio frequency magnetic field therein, of means for determining the reference level of said field, said means comprising an attenuator having a hollow metallic pipe, one end of which is inserted into said resonator body, a Wollaston wire coupled across said one end of said pipe, and a resistance change indicator coupled to and responsive to changes in resistance of said Wollaston wire.

4. The combination with a hollow body resonator having means for producing a ratio frequency magnetic field therein, of means for determining the reference level of said field, said means comprising an attenuator having a hollow metallic pipe, one end of which is inserted into said resonator body, and a Wollaston wire coupled across said one end of said pipe, a coupling loop within said pipe near said Wollaston wire, means for moving said loop toward or away from said Wollaston wire, a load coupled to said loop, and a resistance change indicator coupled to said Wollaston wire.

5. In combination, means for producing a magnetic field, and means for determining the reference level of said field, said last means including a hollow metallic pipe having one end located in said field, and a Wollaston wire one terminal of which is directly connected to said one end of said pipe and the other terminal of which is capacitively coupled to said one end of said pipe, and a resistance change indicator coupled to said Wollaston wire.

6. In combination, means for producing a magnetic field, and means for determining the reference level of said field, said last means including a hollow metallic pipe having one end located in said field, and a Wollaston wire one terminal of which is directly connected to said one end of said pipe and the other terminal of which is capacitively coupled to said one end of said pipe, and a resistance change indicator bridge circuit one of whose arms constitutes said Wollaston wire.

7. A signal generator having, in combination, a resonant chamber having therein a radio frequency field, an attenuator pipe having one end exposed to said field, means for measuring the signal level input to one end of said pipe, said means including a fine resistance wire less than 1 mil in thickness mounted across said one end of said pipe and a resistance change indicator responsive to changes in temperature of said wire, and an adjustable output coupling loop within said attenuator pipe.

8. An attenuator circuit for determining the reference level of a radio frequency magnetic field, comprising a hollow pipe having a Wollaston wire of a thickness of the order of .0001 inch coupled across one end of said pipe and in coupling relation to said field, a coupling loop located within and adjustable in position along said pipe, said loop being located near said Wollaston wire, and an output circuit coupled to said loop.

9. Means for measuring the signal level input to an attenuator pipe, including a fine platinum resistance wire of the order of 0.0001 inch thick mounted across the input end of said attenuator pipe, the resistance of said wire varying in accordance with its absorption of radio frequency power, a probe within and movable in the direction of the length of said pipe and located at an adjustable distance from said wire, an output circuit for said attenuator coupled to said probe, and a resistance change indicator coupled to and operated by said fine resistance wire.

RALPH W. GEORGE.

REFERENCES CITED

The following references are of record in the file of this patent:

UNITED STATES PATENTS

| Number | Name | Date |
|---|---|---|
| 767,971 | Stone | Aug. 16, 1904 |
| 1,901,741 | Fetsch | Mar. 14, 1933 |
| 2,104,916 | Evans | Jan. 11, 1938 |
| 2,106,713 | Bowen | Feb. 1, 1938 |
| 2,125,969 | Turner | Aug. 9, 1938 |
| 2,151,118 | King et al. | Mar. 21, 1939 |
| 2,232,179 | King | Feb. 18, 1941 |
| 2,238,298 | Weholin | Apr. 15, 1941 |
| 2,278,687 | Brown | Apr. 7, 1942 |
| 2,284,379 | Dow | May 26, 1942 |
| 2,365,207 | Moles | Dec. 19, 1944 |
| 2,399,481 | George | Apr. 30, 1946 |
| 2,400,777 | Okress | May 21, 1946 |

OTHER REFERENCES

Principles of Electric Wave Telegraphy, by Fleming, 3rd edition revised and extended, 1916, pages 228, 236, and 237. Copy in Division 51.